Figure 1:
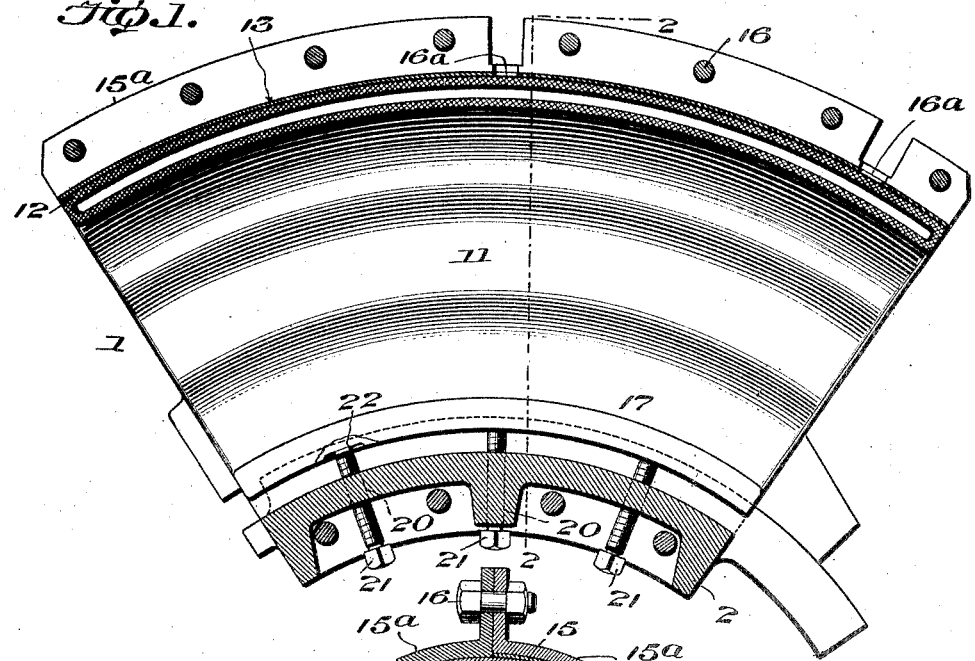

Feb. 12, 1924.

J. D. FITZHARRIS

MOLD 1,483,857

Filed April 21, 1922

Inventor
James D. Fitzharris
Attorney

Patented Feb. 12, 1924.

1,483,857

UNITED STATES PATENT OFFICE.

JAMES D. FITZHARRIS, OF AKRON, OHIO, ASSIGNOR TO THE FIRESTONE TIRE AND RUBBER COMPANY, OF AKRON, OHIO, A CORPORATION OF OHIO.

MOLD.

Application filed April 21, 1922. Serial No. 555,844.

*To all whom it may concern:*

Be it known that I, JAMES D. FITZHARRIS, a citizen of the United States, residing at Akron, in the county of Summit, State of Ohio, have invented certain new and useful Improvements in Molds, of which the following is a specification.

My invention relates to improvements in molds for use in vulcanizing pneumatic tire casings, and it has particular reference to the type of mold commonly used in repair work.

The invention is directed, broadly, toward providing a practical and easily operable mold structure which comprises elements adapted for cooperation to secure an adjustment of certain portions of the mold to enable it to fit accurately all portions of the tire during the vulcanizing operation and to obtain pressure upon the beads of the tire during the process of vulcanization.

Specifically the invention is directed toward embodying means in a particular type of mold whereby a considerable pressure is obtained on the base of the beads, securing better results in the curing of the tire. A further object of the invention is to improve upon the construction of an outer expansible bag or mold and its confining jacket or walls.

With these, and other objects in view, as will hereinafter appear, the invention resides in the combinations and arrangement of elements hereinafter set forth in detail and emphasized in their assembled relation in the claims appended hereto.

Figure 2:
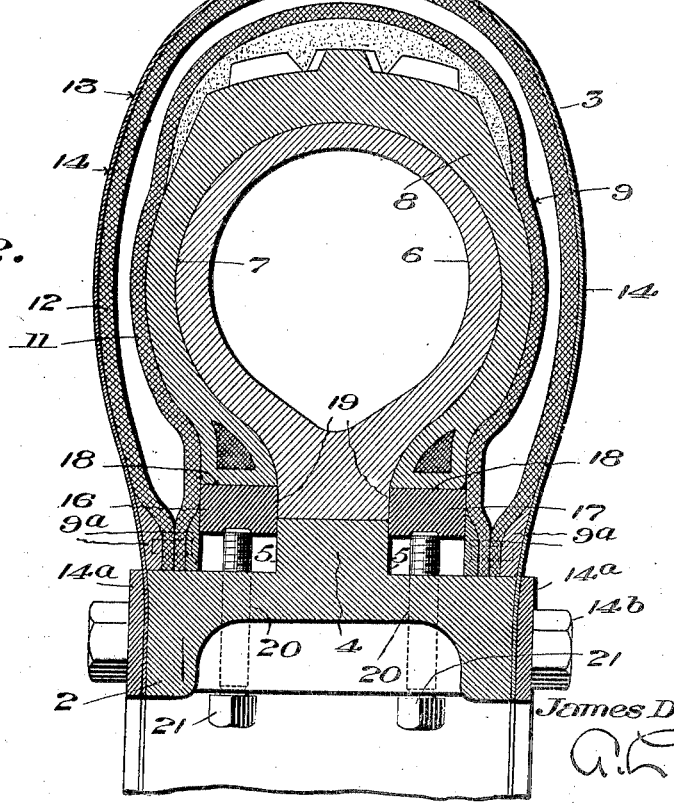

In the drawings accompanying and forming a part of this specification:

Figure 1 is a vertical longitudinal sectional view of a mold embodying my invention; and Figure 2 is a transverse sectional view on an enlarged scale, taken on the line 2—2 of Figure 1 with a tire in position.

Referring, by numeral, to the drawings which are illustrative of a preferred embodiment of my invention, 1 designates, as a whole, a mold, herein shown as a segmental mold, that may be described briefly as comprising a rigid base 2 and a mold portion proper 3 that is semi-flexible in character. It is with this type of mold that my invention is particularly concerned although in actual practice the principles of the invention are applicable in other mold structures.

The base 2 of this mold structure is arcuate and comprises a central radially extending rib 4 that is formed with vertical side walls 5. This flange is designed to seat any suitable core, of the form shown at 6 which forms the inner wall of a mold cavity 7 and serves to support a tire casing 8 in such position that the bead portions thereof are raised or spaced from the base 2. This may be a rigid core or may be an expansible core. The outer wall of the mold cavity 7 is formed by the inner portion of a flexible double walled sheath or envelope 9 designed to receive a pressure medium which may be introduced between the inner and outer walls 11 and 12 thereof in any suitable manner. The provision of any inflatable outer sheath or jacket is, broadly, no part of the present invention. Around the sheath 9 a two part, preferably metallic, shell 13 is disposed, for the purpose of confining the outer wall 12 of the sheath or jacket and directing the force of the pressure, between the walls 11 and 12, against the former wall and consequently against the surface of the casing 8. The shell 13 is preferably formed of thin sheet metal and comprises opposed half portions 14 of segmental shape having their shorter edges suitably secured respectively to the sides of the base 2 by plates 14$^a$ and bolts 14$^b$. Their longer edges adjoin and overlap over the crown of the casing as shown at 15 and are provided with nut and bolt devices 16 passing through flanges 15$^a$ whereby they may be adjusted laterally to suitably cooperate with the sheath 9. Apertures 16$^a$ at the outer edge of the casing may be provided for the admission of an inflating medium which may be steam under pressure. The walls comprising the expansible jacket 9 may be secured together by metallic clamping plates 9$^a$ secured by screws if desired.

I propose, in conjunction with the foregoing mold structure to provide means operable to effect a pressure, that is exerted primarily in a radial direction relative to the tire casing, against the base or inner circumference of the bead portion of the casing during the vulcanizing process. Moreover I propose to adapt such means for adjustment to secure different pressures if desired against different portions of the heel and toe of said beads.

In order to attain this object, and as a preferred means of accomplishing it, I provide segmental, arcuate members 16 and 17 which are disposed in the spaces between the side wall 6 of the flange 4 and the inner side wall 11 of the sheath 9. Each element is preferably rectangular in cross-section to provide an outer surface 18 adapted to bear against the base of the tire bead and movable between the edges of the casing and the lower walls 19 of the core. At suitable distances apart upon each side of the base 2 are a series of radially threaded bores 20. Screw bolts 21 are mounted in the bores 20 the bolts of each series engaging the under surface of the members 16 or 17. Preferably a plurality of elongated sockets 22 are formed in the elements 16 and 17 to receive the ends of the bolts.

The elements 16 and 17 may be forced with the desired degree of pressure against the under surface of the bead portions of the casing by virtue of the foregoing arrangement.

The foregoing structure is quickly and easily adjusted and by the use of the device pressure may be obtained in the base of the beads. It is to be understood, however, that the present disclosure is illustrative in character and is, therefore, not to be construed as limiting the scope or spirit of the invention unless such limitations are expressly indicated in the claims appended hereto.

What I claim is:

1. A segmental mold having a cavity therein adapted to receive a portion of a tire casing comprising, a core arranged to form the inner wall of the cavity, an expansible jacket surrounding the core to form the outer wall of the cavity, and means adapted for adjustment between the walls of the cavity to compress a portion of the casing.

2. A segmental mold having a cavity therein adapted to receive a portion of a tire casing comprising, a core arranged to form the inner wall of the cavity, an expansible jacket surrounding the core to form the outer wall of the cavity, and means adapted for adjustment between the walls of the cavity to compress the bead portions of the casing.

3. A segmental mold having a cavity therein adapted to receive a portion of a tire casing comprising, a core arranged to form the inner wall of the cavity, a flexible element surrounding the core to form the outer wall of the cavity, and means adapted for adjustment within the cavity and radially of the casing to effect pressure against a portion of said casing.

4. A segmental mold having a cavity therein adapted to receive a portion of a tire casing comprising, a core arranged to form the inner wall of the cavity, a flexible element arranged to surround the core to form the outer wall of the cavity, and means adapted for adjustment within the cavity to exert pressure against the base portions of the beads.

5. A segmental mold having a cavity therein adapted to receive a portion of a tire casing comprising, a core arranged to form the inner wall of the cavity, a flexible element adapted to surround the core to form the outer wall of the cavity, and adjustable means adapted within the cavity to compress the underside portion of the beads of the casing, said means being adjustable radially of the casing.

6. A segmental mold having a cavity therein adapted to receive a portion of a tire casing comprising, a core arranged to form the inner wall of the cavity, a flexible element adapted to surround the core to form the outer wall of the cavity, and an arcuate element disposed within the cavity in position to engage the heel and toe portion of one bead of the casing said arcuate element being adjustable radially with respect to the casing.

7. A device for use in curing tires comprising, a base member, a core seated on the base member, an expansible jacket surrounding the core and spaced therefrom and a non-expansible shell on the outside of said jacket, and means to secure the shell to the base member.

8. A device for use in curing tires comprising a base member, a core seated on the base member, an expansible jacket surrounding the core and spaced therefrom and a metallic shell on the outside of the jacket, means to secure the shell to the base member, compression members between the core and the jacket, and means to force the compression members outwardly of the base.

9. A device for curing tires comprising, a core, a jacket surrounding the core, said jacket being composed of flexible walls, a two part metallic shell surrounding the jacket, a base member for supporting the core, and means to secure the parts of the shell to the base and to each other.

10. A device for curing tires comprising, a core, a jacket surrounding the core, said jacket being composed of flexible walls, means to secure the walls together, a non-expansible shell about the jacket, and means between the core and the jacket to exert a radially outward pressure on the base of the tire beads.

JAMES D. FITZHARRIS.